(12) United States Patent
Lin et al.

(10) Patent No.: US 7,241,049 B2
(45) Date of Patent: Jul. 10, 2007

(54) MICROPORE ENGAGEMENT SURFACES FOR EARTH BORING BIT

(75) Inventors: Chih Lin, Spring, TX (US); Eric Sullivan, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 36 days.

(21) Appl. No.: 11/003,132

(22) Filed: Dec. 3, 2004

(65) Prior Publication Data

US 2006/0120640 A1    Jun. 8, 2006

(51) Int. Cl.
    *F16C 17/10* (2006.01)
(52) U.S. Cl. ....................................................... 384/95
(58) Field of Classification Search ................. 384/95, 384/93, 96, 94; 175/371
    See application file for complete search history.

(56) References Cited

U.S. PATENT DOCUMENTS

| | | | |
|---|---|---|---|
| 5,834,094 A | 11/1998 | Etsion et al. | |
| 5,952,080 A | 9/1999 | Etsion et al. | |
| 6,002,100 A | 12/1999 | Etsion | |
| 6,026,917 A | 2/2000 | Zahradnik et al. | |
| 6,046,430 A | 4/2000 | Etsion | |
| 6,341,782 B1 | 1/2002 | Etsion | |

OTHER PUBLICATIONS

ASME Journal of Tribology, 121 (1999), 927-932, *Effect of Pore Ensemble Statistics on Load Support of Mechanical Seals With Pore-Covered Faces*, by Dr. Leonid Burstein and Dr. Dov Ingman, pp. 1-17.
*Wear Results in Laboratory Tests*, two pages, nor date.
*Seal Interface Tribological Modeling*, pp. 106-125, no date.

*Primary Examiner*—Lenard A. Footland
(74) *Attorney, Agent, or Firm*—Bracewell & Giuliani LLP

(57) ABSTRACT

An earth boring bit has sliding engaging surfaces between a cone assembly and a bearing pin. Micropores are formed in at least one of the engaging surfaces. Each of the micropores has a leading portion and a trailing portion. The leading portion is at a more gradual slope than the trailing portion. The micropores are located in a pattern of a greater density in a region of the engaging surfaces that operate at higher pressures than in other regions.

18 Claims, 3 Drawing Sheets

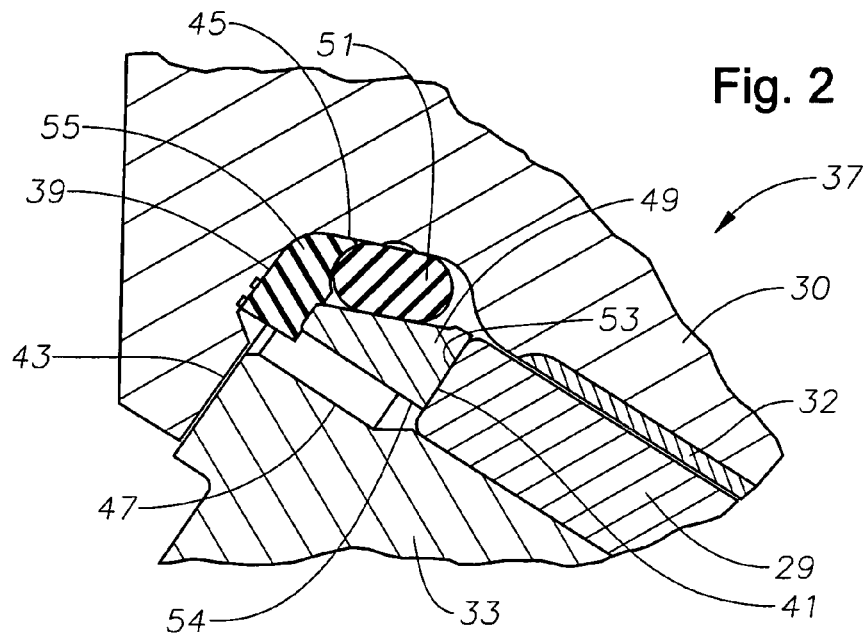
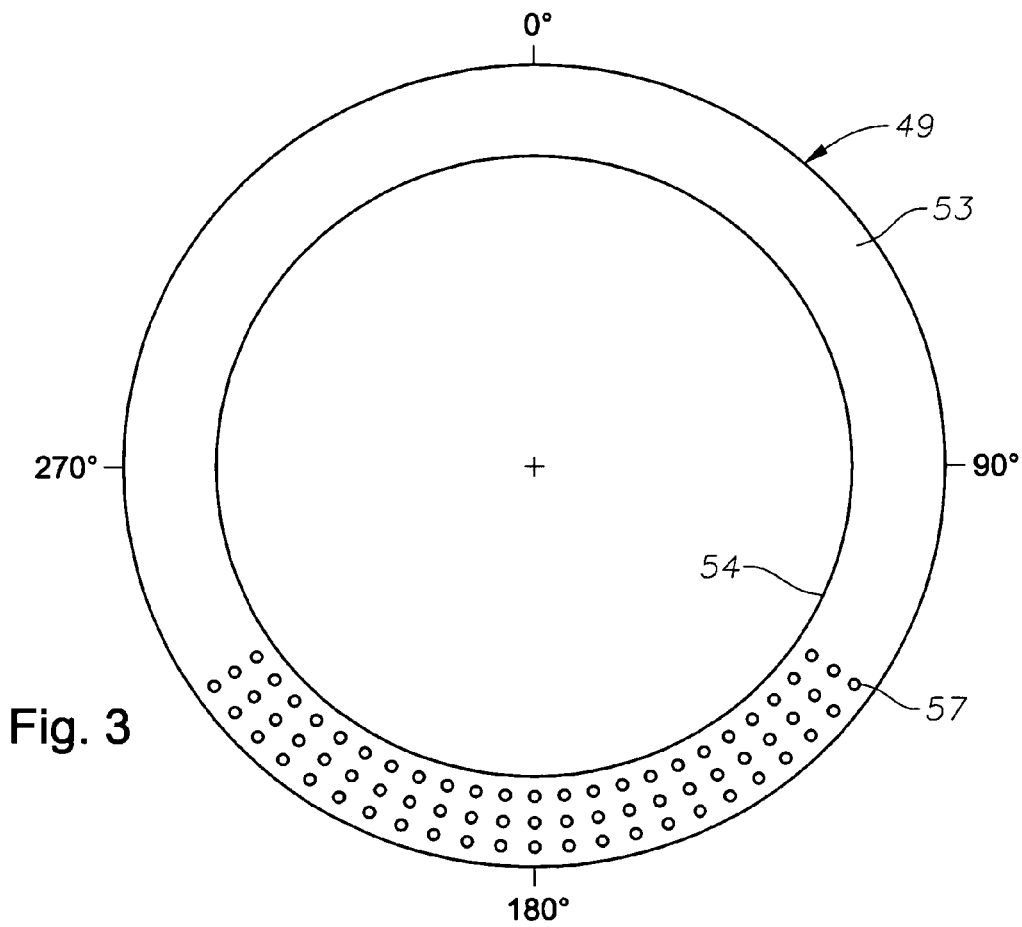

MICROPORE ENGAGEMENT SURFACES FOR EARTH BORING BIT

FIELD OF THE INVENTION

This invention relates to earth boring rotating cone bits, and particularly to providing micropores on sliding engagement surfaces of the cone and the mating bearing pin.

BACKGROUND OF THE INVENTION

One type of earth boring bit utilizes cones that are rotatably mounted to bearing pins of the bit body. The cones have cutting elements on their exteriors. As the bit rotates, the cones rotate to cause the cutting elements to disintegrate the earth formation. The cylindrical portion of bearing pin and cylindrical cavity of the cone define a journal bearing. Thrust bearing surfaces are located between flat portions of the bearing pin and cone cavity. The bearing spaces between the cone and bearing pin are filled with a lubricant. A pressure compensator equalizes pressure of the lubricant with the hydrostatic pressure on the exterior. A seal assembly seals the lubricant within the bearing spaces.

A variety of seals have been employed in the past. One type of seal uses metal-to-metal sliding contact. The seal assembly has a stationary metal ring and a rotating metal ring with the rotating ring rotating with the cone. The faces of the rings slidingly engage each other. The seal assembly has an elastomeric member that urges the rings in engagement with each other.

The journal and thrust bearings comprise metal surfaces that slidingly engage each other. Inlays may be employed in areas of the bearing surfaces to enhance the life of the bearing. Various coatings and metallurgical treatments to the seal faces and bearings have been proposed. These coatings including metal films and diamond and diamond-like layers. These bits are often run to destruction. To obtain the longest possible life at a desirable rate of penetration, the seal assembly should not leak or fail and the bearings surfaces should not wear excessively before the cutting structure is worn out.

Though not to employed with earth boring bits in the past, one technique for enhancing seal and bearing life in general is to provide a pattern of micropores in one of the rotating surfaces. These micropores comprise small holes or dimples formed in a pattern throughout one of the sliding surfaces. Each micropore of the prior art type is symmetrical, having leading and trailing portions that are the same slope.

SUMMARY OF THE INVENTION

In this invention, micropores are placed on at least one of the engaging surfaces between a cone assembly and a bearing pin of an earth boring bit. The micropores are preferably asymmetrical, each having a leading portion that differs from the trailing portion. The leading portion has a more gradual slope than the trailing portion to enhance pressure increases or spikes in the grease contained between the cone assembly and bearing pin. The pressure spikes reduce contact stresses to increase the life of the engaging surfaces.

Preferably, the engaging surface that contains the micropores has a coating that is harder than the underlying supporting member. The coating may be a conventional type, such as titanium nitride applied by a physical vapor deposition process. The micropores are formed in the engagement surface after the coating is applied.

The engaging surfaces between the cone and bearing pin typically have an area with higher contact pressure than another area. For example, the pressure is higher on the lower side of the bearing pin than on the upper side because of the weight of the drill string. In one embodiment, there is a higher density of micropores within the higher pressure region than in the lower pressure region. The density in the lower pressure region may be zero.

BRIEF DESCRIPTION OF THE DRAWINGS

FIG. 2 is an enlarged, fragmentary sectional view of the seal assembly of the earth boring bit of FIG. 1.

FIG. 3 is an enlarged elevational view of the engaging face of the stationary seal ring of the seal assembly of FIG. 2, shown removed from the remaining portions of the seal assembly.

DETAILED DESCRIPTION OF THE INVENTION

Figure 1:
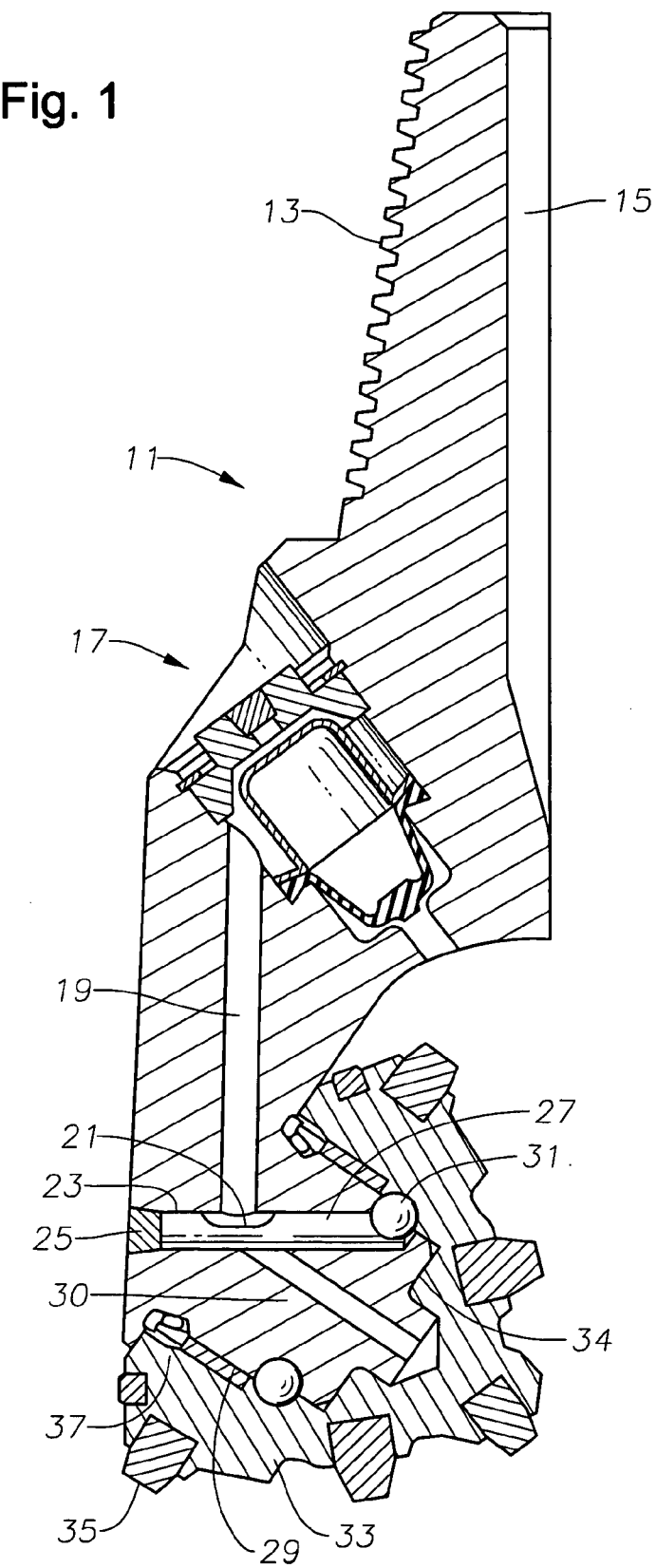
FIG. 1 is a longitudinal sectional view of an earth boring bit constructed in accordance with the invention.

The numeral 11 in FIG. 1 of the drawing designates an earth-boring bit having a threaded upper portion 13 for connection to a drill string member (not shown). A fluid passage 15 directs drilling fluid to a nozzle (not shown) that impinges drilling fluid or mud against the borehole bottom to flush cuttings to the surface of the earth.

A pressure-compensating lubrication system 17 is contained within each section of the body, there usually being three, which are welded together to form the composite body. The lubrication system is preferably similar to that shown in U.S. Pat. No. 4,727,942.

In each section of the body, a lubricant passage 19 extends from each compensator 17 downwardly into intersection with another lubricant passage 21 in which a ball plug 23 is secured to the body by a plug weld 25. The preferred lubricant is grease, and in one example, the grease has a viscosity of about 8.9 poise at 150 degrees F. and 15 psi. Lubricant passages 27 carry lubricant to a cylindrical journal bearing surface defined between a cylindrical insert ring 29 (interference fit in cone 33) and a corresponding cylindrical surface on bearing shaft 30. Bearing shaft or pin 30 is cantilevered downwardly and inwardly from an outer and lower region of the body of the bit, commonly known as the shirttail. As shown in FIG. 2, one or more inlay strips 32, typically of a harder lubricating metal, may be located on the lower side of bearing shaft 30. A thrust bearing 34 (FIG. 1) is defined between flat surfaces on bearing shaft 30 and in the cavity of cone 33.

Ball plug 23 retains a series of balls 31 that rotatably secure cone 33 to bearing shaft 30. Cone 33 has a plurality of rows of earth-disintegrating cutting elements 35 that may be constructed of a sintered tungsten carbide and secured by interference fit into mating holes in cone 33. Alternately, cutting elements 35 may be teeth machined in the surface of cone 33. A seal assembly 37 is disposed adjacent the base of bearing shaft 30 to seal lubricant within the bearing and debris out of the bearing.

Referring to FIG. 2, a flat surface 39 is formed on a last-machined surface 43 of the shirttail portion of the bit body. A rotating seal face 41 is located on an end of insert ring 29, which is also referred to herein as a rotating ring because it rotates with cone 33. Rotating seal face 41 faces flat surface 39 and is spaced axially from it along an axis of bearing shaft 30. Flat surface 39 and rotating seal face 41 cooperate with a pair of surfaces 45, 47 to define a bearing seal gland or cavity generally at the base of bearing shaft 30. In this embodiment, surface 47 is a cylindrical surface formed in the cavity of cone 33, and surface 45 is a conical recess formed at the base of bearing shaft 30.

Seal ring assembly 37 includes a rigid, stationary seal ring 49 that slidingly engages seal face 41 and an O-ring energizer 51, which urges a seal face 53 on stationary seal ring 49 into sealing engagement with seal face 41 on insert ring 29 in cone 33. This rigid face seal is formed in accordance with U.S. Pat. No. 4,753,304. Other types of metal face seals are also feasible. A secondary elastomeric seal ring 55 is disposed in the seal gland between seal assembly 37 and last-machined surface 43 to seal the seal gland and seal assembly 37 against entry of debris, particularly drilling mud particles, from the exterior of bit 11. To accommodate seal ring 55 and seal 37, flat surface 39 is in a groove machined into last-machined surface 43 to a depth approximately one-third to one-half the nominal axial thickness of seal ring 55.

Figure 4:
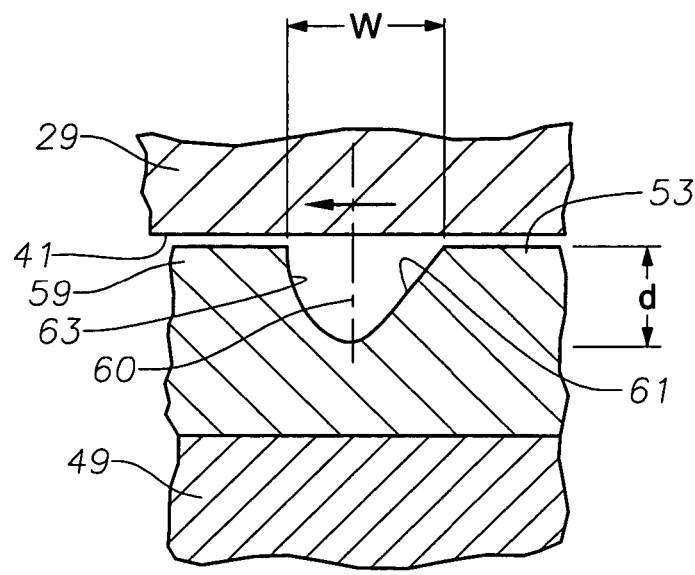
FIG. 4 is an enlarged sectional view of the stationary seal ring of FIG. 3, taken along the line 4—4 of FIG. 5, and further showing a portion of the rotating ring of the seal assembly.

As illustrated in FIG. 4, stationary ring 49 preferably has a thin coating 59 on seal face 53. The clearance between seal faces 41, 53 is exaggerated in FIG. 4. Coating 59 may be of a variety of conventional types that is applied to steel bearing and seal surfaces to increase wear resistance. Stationary seal ring 49 is normally constructed of steel, such as 440C, which has a hardness of about 55 Rockwell "C". The hardness of coating 59 is significantly harder. By way of example, coating 59 may be titanium nitride, chromium nitride, a ceramic material, diamond, or a diamond like material. Coating 59 may be applied by conventional techniques, such as chemical vapor deposition (CVD) or pressure vapor deposition (PVD), which is preferred because it occurs at a lower temperature than CVD. Other techniques to form coating 59 are feasible, such as laser hardening, laser glazing, thermal spray or the like. The depth of coating 59 is about one to six microns. Coating 59 may be applied also to rotating seal face 41.

One or both of the seal faces 41, 53 preferably contains a plurality of micropores 57. In the preferred embodiment, micropores 57 are located only on seal face 53 of stationary seal ring 49. Micropores 57 are very small holes or dimples formed in seal face 53 after coating 59 has been applied. Micropores 57 are formed by laser, chemical etching, or other known techniques. Each micropore 57 has a depth d of about 1 to 10 microns, thus depth d may be less than the depth of coating 59 as shown in FIG. 4. The entry opening of each micropore 57 may be circular shown in FIG. 5 or some other shape. The width or diameter of the entry opening of each micropore 57 is typically somewhat greater than the depth d. The base of each micropore 57 is concave and smaller in diameter than the entry opening.

Preferably, each micropore 57 is asymmetrical in cross-section relative to a centerline 60 of the entry opening. The arrow in FIG. 4 indicates the direction of movement of rotating ring 29 relative to stationary ring 49. Considering this direction of movement, each micropore 57 has a leading portion 61 and a trailing portion 63. In other words, a point on rotating ring 29 would pass leading portion 61 before passing trailing portion 63. Preferably leading portion 61 slopes at a greater angle relative to centerline 60 than trailing portion 63. Leading portion 61 intersects seal face 53 at a lesser angle than trailing portion 63. Leading and trailing portion 61, 63 may be concave or straight. The more gradual leading portion 61 facilitates entry of the grease into mocropore 57 that moves along with rotating ring 29 due to friction. The steeper trailing portion 63 causes a sharp dynamic pressure spike to occur in the grease at that point.

Figure 5:
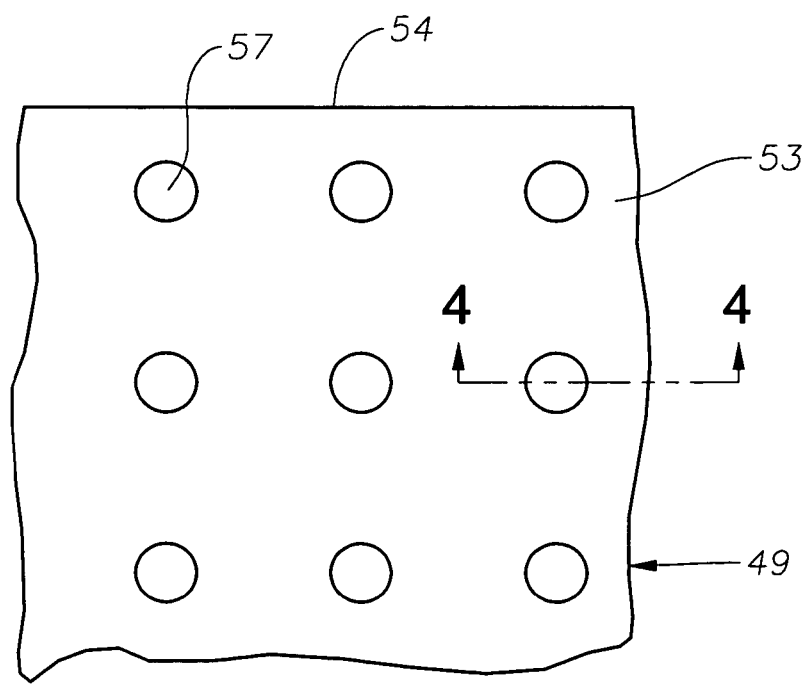
FIG. 5 is an enlarged elevational view of a portion of the stationary seal ring as shown in FIG. 3.

Referring to FIG. 5, micropores 57 are spaced apart from each other a distance greater than their widths w (FIG. 4). Preferably the distance between the centerline of one micropore 57 to the centerline of another micropore 57 is in the range from 2 to 5 times the width w.

Micropores 57 could be located in a uniform pattern completely covering stationary seal face 53. Alternately, referring to FIG. 3 for one example, micropores 57 are located only in a selected region of stationary seal face 53, such as from about 60 degrees to 240 degrees. The zero degree point in FIG. 3 refers to the top dead center of bearing pin 30 (FIG. 1), which is the point closest to threaded upper portion 13. The 180 degree point refers to the bottom dead center of bearing pin 30. The lower region may be considered to be all of the portions of seal face 53 below the 90 degree–270 degree line. Preferably the density of micropores 57 is greater in the lower region than in the upper region. In fact, in this embodiment, the upper region is entirely free of micropores, thus its density is zero. The lower region experiences greater contact stress or pressure than the upper region because of the downward thrust exerted on bit 11 (FIG. 1), thus the lower region generates more heat. Micropores 57 in the lower region reduce the amount of heat generated in that region.

In operation, the operator applies a high downward load on drill bit 11 and rotates it simultaneously. The operator also pumps drilling fluid down the drill string, which discharges through fluid passages 15, and flows back up the borehole surrounding the drill string. Lubricant compensator 17 reduces and preferably equalizes, the pressure of lubricant in passages 19, 21 and 27 with the hydrostatic pressure of the drilling fluid.

The drill string weight imposed on drill bit 11 creates more contact force or pressure on the lower region of bearing pin 30 than on the upper side. The contact pressure is also greater on the lower region of stationary seal ring 49 than in the upper region. As cone 33 rotates, rotating ring 29 rotates with it. Face 41 of rotating ring 29 slidingly engages face 53 of stationary ring 49. Referring to FIG. 4, some of the grease moves with rotating ring 29 due to friction. As the grease reaches one of the micropores 57, the lubricant pressure drops as it encounters leading portion 61, then sharply increases as it encounters the sharper slope of trailing portion 63. The positive pressure spike reduces the contact pressure between faces 41 and 53, thus reducing wear.

Referring to FIG. 3, micropores 57 in the lower region reduce the heat that would be generated otherwise than if no micropores were employed. The upper region, which is free of micropores 57 in this example, generates approximately the same amount of heat as in the upper region of the prior art, which is normally less than the lower region because of the lower contact pressure. The temperature differential between the lower and upper regions in this embodiment is less than in the prior art, reducing the amount of heat that flows upward from the lower region to the upper region. Because of the lesser temperature differential, the heat generated by the lower region flows radially outward, relative to the axis of bearing shaft 30 (FIG. 1).

Hard coatings and micropores as described could also be located on other sliding engaging surfaces of bit 11. For example, the coating and micropores could be formed on one or both of the thrust surfaces 34 (FIG. 1) and portions of the journal bearing surfaces of cone 33 and bearing shaft 30. For example, micropores could be located on the lower region of bearing shaft 30 between or in place of inlays 32 (FIG. 2).

The invention has significant advantages. The use of micropores on the engaging faces prolongs the life of the bit by enhancing lubrication and reducing heat. The hardened layer on the surface of the engaging face in combination with the micropores provides a longer life.

While the invention has been shown in only one of its forms, it should be apparent to those skilled in the art that it is not so limited but is susceptible to various changes without departing from the scope of the invention.

The invention claimed is:

1. In an earth boring bit having at least one bit leg having a depending bearing pin, a cone assembly rotatably mounted to the bearing pin, the cone assembly having a rotating engaging surface that slidingly engages a stationary engaging surface of the bearing pin, the improvement comprising:
    a plurality of micropores formed in the at least one of the engaging surfaces, each of the micropores having a leading portion and a trailing portion, the leading portion being at a more gradual slope than the trailing portion.

2. The bit according to claim 1, further comprising a coating on said at least one of the engaging surfaces, the coating being harder than underlying supporting metal of said at least one of the engaging surfaces.

3. The bit according to claim 1, wherein the micropores have a selected density in one region of said at least one of the engaging surfaces, and said at least one of the engaging surfaces has a second region that has a lesser density of the micropores.

4. The bit according to claim 1, wherein said at least one of the engaging surfaces comprises the the stationary engaging surface, the stationary engaging surface having a lower region and an upper region, and wherein a density of the micropores is greater in the lower region than the upper region.

5. The bit according to claim 1, wherein wherein said at least one of the engaging surfaces comprises the stationary engaging surface, the stationary engaging surface having a lower region and an upper region, and wherein the micropores are located in the lower region, and the upper region is free of the micropores.

6. An earth boring bit having at least one bit leg having a depending bearing pin, a cone rotatably mounted to the bearing pin, a lubricant compensator for reducing a pressure difference between borehole fluid on the exterior of the bit and grease in spaces between the bearing pin and the cone, and a seal assembly that seals grease within the spaces, comprising:
    a stationary ring mounted stationarily with the bearing pin and a rotating ring mounted for rotation with the cone, the rings having seal faces in sliding contact with each other; and
    a plurality of micropores formed in at least one of the seal faces, each of the micropores having a leading portion and a trailing portion, the trailing portion being at a steeper angle relative to the seal faces than the leading portion.

7. The bit according to claim 6, further comprising a coating on said at least one of the seal faces, the coating being harder than underlying supporting metal of said at least one of the seal faces, the micropores being formed in the coating.

8. The bit according to claim 6, wherein the micropores have a selected density in one region of said at least one of the seal faces, and said at least one of the seal faces has a second region that has a lesser density of the micropores.

9. The bit according to claim 6, wherein said at least one of the seal faces comprises the seal face of the stationary ring, the seal face of the stationary ring having a lower region and an upper region, and wherein a density of the micropores is greater in the lower region than the upper region to create a heat imbalance.

10. The bit according to claim 6, wherein said at least one of the seal faces comprises the seal face of the stationary ring, the seal face of the stationary ring having a lower region and an upper region, wherein the micropores are located in the lower region, and the upper region is free of the micropores.

11. In an earth boring bit having at least one bit leg having a depending bearing pin, a cone assembly rotatably mounted to the bearing pin, the cone assembly having a rotating engaging surface that slidingly engages a stationary engaging surface of the bearing pin, the stationary engaging surface having an upper region at an upper portion of the bearing pin that encounters less pressure during drilling than a lower region at a lower portion of the bearing pin, the improvement comprising:
    a plurality of micropores formed in the stationary engaging surface, the lower region of the stationary engaging surface having a greater density of the micropores than the upper region.

12. The bit according to claim 11, wherein the upper region is free of the micropores.

13. The bit according to claim 11, wherein each of the micropores has a leading portion and a trailing portion, the leading portion being at a more gradual slope than the trailing portion.

14. The bit according to claim 11, further comprising a coating on the engaging surface, the coating being harder than underlying supporting metal of the engaging surface.

15. An earth boring bit, comprising:
    at least one bit leg having a depending bearing pin;
    a cone rotatably mounted to the bearing pin;
    a metal seal ring mounted stationarily around the bearing pin for engaging a rotating seal surface in the cone, the seal ring having an upper portion on an upper side of the bearing pin and a lower portion on a lower side of the bearing pin; and
    a plurality of micropores formed in the seal ring, the seal ring having a greater density of micropores in the upper portion than in the lower portion.

16. The bit according to claim 15, wherein the upper portion is free of the micropores.

17. The bit according to claim 15, wherein each of the micropores is asymmetrical in cross-section, having a leading portion and a trailing portion, the leading portion being at a more gradual slope than the trailing portion relative to an axis of each of the micropores.

18. The bit according to claim 15, further comprising a coating on the seal ring, the coating being harder than underlying supporting metal of the seal ring.

* * * * *

UNITED STATES PATENT AND TRADEMARK OFFICE
CERTIFICATE OF CORRECTION

PATENT NO. : 7,241,049 B2  Page 1 of 1
APPLICATION NO. : 11/003132
DATED : July 10, 2007
INVENTOR(S) : Chih Lin et al.

It is certified that error appears in the above-identified patent and that said Letters Patent is hereby corrected as shown below:

<u>In the Claims:</u>

Column 5, line 39, delete "the" (second occurrence) before "stationary"

Signed and Sealed this

Fourth Day of December, 2007

JON W. DUDAS
*Director of the United States Patent and Trademark Office*